US010687509B1

(12) United States Patent
Harada et al.

(10) Patent No.: US 10,687,509 B1
(45) Date of Patent: Jun. 23, 2020

(54) FEEDTHROUGH ELECTRICAL CONNECTION, AND EXPERIMENTAL ANIMAL CAGES AND MONITORING SYSTEMS INCLUDING THE SAME

(71) Applicant: Vium, Inc., San Mateo, CA (US)

(72) Inventors: Kevin Harada, San Mateo, CA (US); Jonathan Noble Betts-Lacroix, Belmont, CA (US)

(73) Assignee: Vium, Inc., San Mateo, CA (US)

( * ) Notice: Subject to any disclaimer, the term of this patent is extended or adjusted under 35 U.S.C. 154(b) by 574 days.

(21) Appl. No.: 15/280,565

(22) Filed: Sep. 29, 2016

(51) Int. Cl.
*A01K 1/03* (2006.01)
*A01K 29/00* (2006.01)

(52) U.S. Cl.
CPC ............ *A01K 1/031* (2013.01); *A01K 29/005* (2013.01)

(58) Field of Classification Search
CPC .............................. A01K 1/031; A01K 29/005
USPC .......... 119/416, 417, 421, 452; 439/86, 271, 439/283, 299, 301, 310, 345, 373
See application file for complete search history.

(56) References Cited

U.S. PATENT DOCUMENTS

| 3,367,308 | A | * | 2/1968 | Quattrone | A01K 1/031 119/420 |
| 3,464,388 | A | * | 9/1969 | Stout | A01K 1/031 119/418 |
| 3,566,838 | A | * | 3/1971 | Edwards | A01K 1/0107 119/161 |
| 4,220,386 | A | * | 9/1980 | Kenny | A61N 1/3752 439/281 |
| 4,332,214 | A | * | 6/1982 | Cunningham | A01K 1/0353 119/28.5 |
| 4,411,491 | A | * | 10/1983 | Larkin | H01R 13/523 385/59 |
| 4,649,862 | A | * | 3/1987 | Neary | A01K 1/011 119/165 |
| 5,794,567 | A | * | 8/1998 | Itzhak | A01K 1/003 119/416 |
| 6,062,224 | A | * | 5/2000 | Kissinger | A01K 1/031 119/421 |
| 6,305,324 | B1 | * | 10/2001 | Hallock | A01K 1/031 119/248 |

(Continued)

OTHER PUBLICATIONS

U.S. Appl. No. 15/282,472, filed Sep. 30, 2016, to Betts-Lacroix et al.

(Continued)

*Primary Examiner* — Tien Q Dinh
*Assistant Examiner* — Brady W Frazier
(74) *Attorney, Agent, or Firm* — Nienstadt PLLC

(57) ABSTRACT

A cage for housing at least one experimental animal is disclosed. The cage may include one or more walls that enclose a living space for at least one experimental animal with at least one wall comprising a plastic material. At least one electrical feedthrough may traverse the wall. The electrical feedthrough may include an internal electrical contact located inside the living space and an external electrical contact located outside the living space. The internal and external electrical contacts may be electrically connected. A system for monitoring at least one experimental animal and an electrical feedthrough for providing electrical continuity through a wall of a cage for housing an experimental animal is also disclosed.

29 Claims, 16 Drawing Sheets

(56) References Cited

U.S. PATENT DOCUMENTS

| | | | |
|---|---|---|---|
| 6,725,805 B1 * | 4/2004 | Bach | A01K 1/0218 119/311 |
| 6,810,833 B2 * | 11/2004 | Bonner | A01K 1/03 119/452 |
| 6,953,266 B1 * | 10/2005 | Ver Hage | A01K 1/031 119/452 |
| 7,934,472 B2 * | 5/2011 | Weatherford | G05D 23/19 119/448 |
| 8,925,882 B1 * | 1/2015 | Miller | A01K 1/031 248/219.1 |
| 10,064,392 B1 | 9/2018 | Betts-Lacroix | |
| 2002/0148410 A1 * | 10/2002 | Thomas | A01K 1/0236 119/452 |
| 2002/0151210 A1 * | 10/2002 | Singh | B60R 16/0207 439/495 |
| 2003/0024482 A1 * | 2/2003 | Gondhalekar | A01K 1/031 119/417 |
| 2003/0196607 A1 * | 10/2003 | Hong | A01K 29/005 119/421 |
| 2005/0241591 A1 * | 11/2005 | Ingley, III | A01K 1/031 119/455 |
| 2006/0278171 A1 * | 12/2006 | Conger | A01K 1/0356 119/419 |
| 2007/0006820 A1 * | 1/2007 | Denault | A01K 1/031 119/792 |
| 2007/0127118 A1 * | 6/2007 | Nilson | A01K 1/031 359/385 |
| 2007/0210447 A1 * | 9/2007 | Kinsley | H01L 24/72 257/723 |
| 2009/0126640 A1 * | 5/2009 | Ulman | A01K 1/031 119/54 |
| 2010/0120276 A1 * | 5/2010 | White | H01R 13/447 439/148 |
| 2013/0052850 A1 * | 2/2013 | Osterhart | H01R 13/4223 439/345 |
| 2013/0255586 A1 * | 10/2013 | Gerashchenko | A01K 29/005 119/421 |
| 2013/0305605 A1 * | 11/2013 | Wang | A01K 63/065 47/66.6 |
| 2014/0058214 A1 * | 2/2014 | Woodward | A61B 5/1427 600/301 |
| 2014/0140582 A1 * | 5/2014 | Spicola, Jr. | A01K 29/005 382/110 |

OTHER PUBLICATIONS

U.S. Appl. No. 15/282,549, filed Sep. 30, 2016, to Betts-Lacroix et al.

* cited by examiner

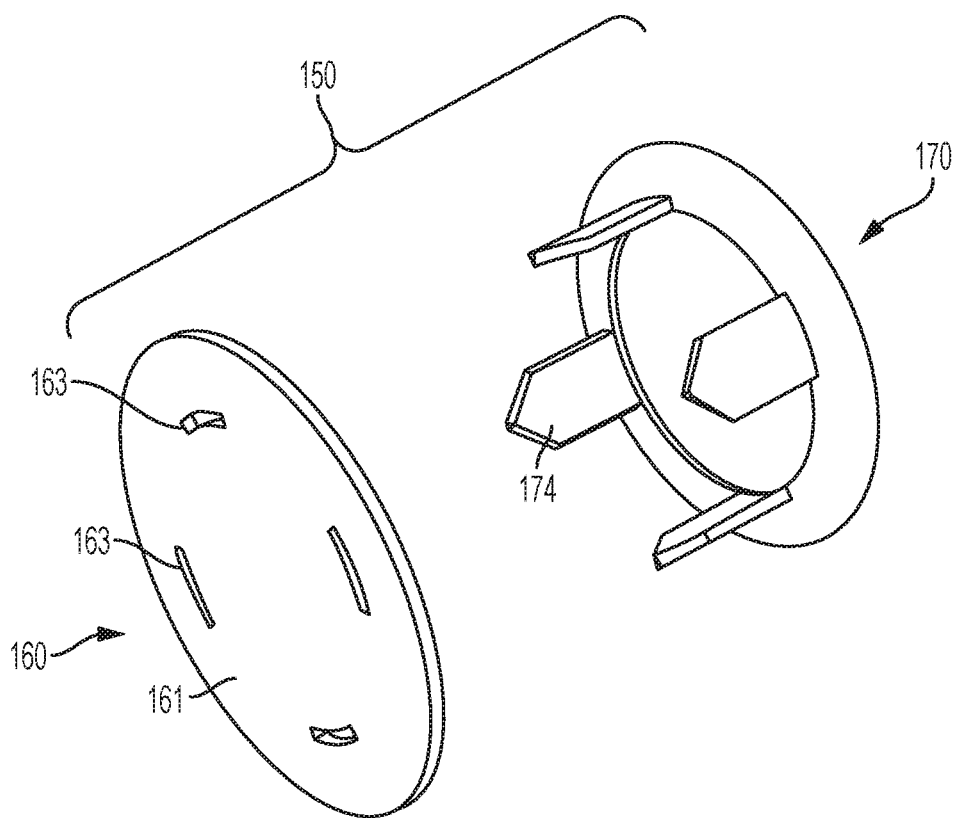
FIG. 7A
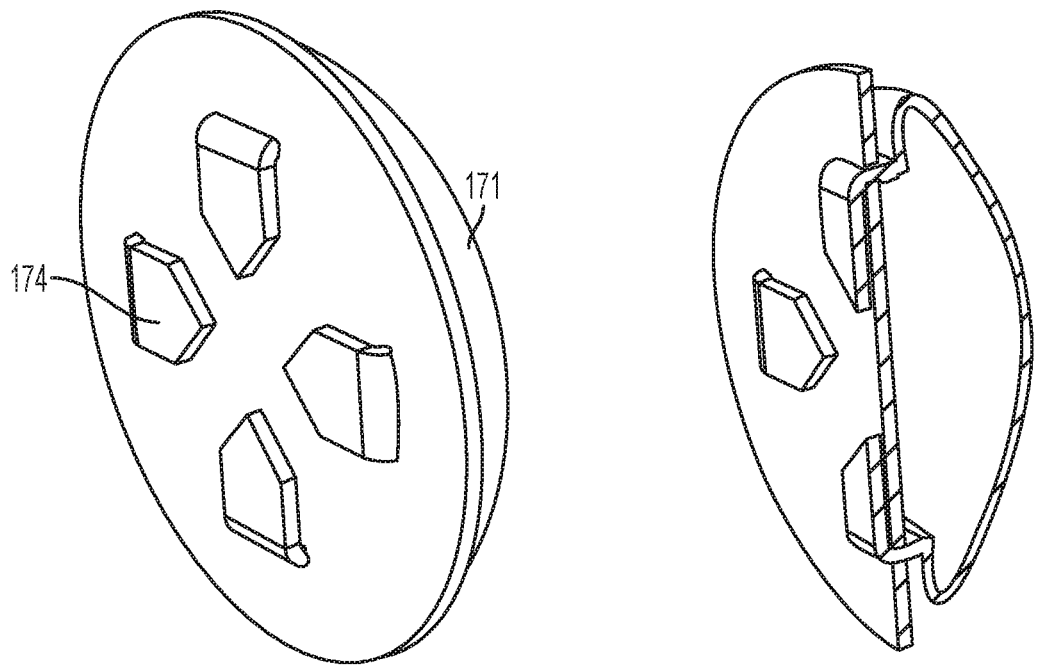
FIG. 7B
FIG. 7C

FEEDTHROUGH ELECTRICAL CONNECTION, AND EXPERIMENTAL ANIMAL CAGES AND MONITORING SYSTEMS INCLUDING THE SAME

TECHNICAL FIELD

This application relates to electrical feedthroughs for cages for experimental animals.

BACKGROUND

Research is commonly performed on experimental animals that are housed in cages. Typically, these experimental animals are small mammals, such as mice or rats. The research may involve, for example, a drug test, a nutritional test, a genetic test, a test of a surgical procedure, an optogenetics test, or another observation of a physiological or behavioral response to a change in environmental condition or other stimulus. The experimental animals may be divided into a control group and one or more experimental groups. The cages in which the animals are housed may be arrayed, such as in racks.

The housed animals are typically checked in at least two ways: husbandry checks and experimental checks. Husbandry refers to serving the physiological needs of the animals. Husbandry may include observing the wellbeing of the animals, such as, for example, a health check once or twice a day to make sure that none of the animals has developed any symptoms of disease or has died. Health checks may involve looking at the animals through the transparent cage walls in situ without moving the cages, or alternatively pulling the cages partially or completely out of their racks to visually inspect the animals. Experimental checks, meanwhile, are performed to obtain data for the research being conducted. Experimental checks may involve closer examination of the animals than husbandry checks, such as involving opening the cages and removing the animals from the cages. Experimental checks may involve, for example, looking for clinical symptoms in the animals. Experimental checks may also include behavioral tests, such as, for example, water maze or hole board tests, extractions of blood or tissue from the animals, or measurements, such as imaging of the animals.

However, physically contacting the animals, such as through opening the animals' cages, removing them from their cages, and performing measurements on them—or even just approaching the cage to view the animal through the bidirectionally transparent wall, or partially sliding the cage containing the animal out of a rack—can physiologically or psychologically perturb the animals. The consequences of these types of perturbations are often not well understood. Furthermore, there may be inconsistencies in the perturbations, such as differences in when and how the human technicians perform checks across different individual animals. The animals' physiological states and behavior may therefore be altered in ways that are difficult to predict and inconsistent between distinct animals. Thus, these measurement techniques can interfere significantly with the quality of the data obtained from the experiment.

The process of checking the experimental animals may also cause contamination of the animal's living space or the testing equipment. This contamination may, in turn, exacerbate the differences in conditions under which the animals are housed. For example, one human technician may introduce one particular foreign odor into one living space, while another human technician introduces a different odor into another living space. The human technicians, who are handling animals from different cages or using common equipment, may also cause cross-contamination between animals in different cages. In addition, a substantial amount of resources, such as the time and labor of skilled technicians, is expended to monitor the animals. This can account for a significant amount of the total cost of running such an experiment.

Thus, it is desirable to perform checks on experimental animals and provide stimuli to experimental animals in a way that yields rich, high-resolution, and reliable data in relation to the number of animals. It is also desirable to avoid physical contact with the animals, inconsistent perturbations of the animals, and cross-contamination between animals in different cages when the animals are checked. Moreover, it is desirable to reduce the amount of time and labor that is expended on running the animal experiment.

To address these desires, experimental animals may be monitored, at least in part, by electronic devices housed within the cage. For example, a cage may have an electronic scale inside to weigh an experimental animal. It may also be advantageous to include other electronic devices that provide inputs, for example, various stimuli, experimental drugs, or nutrition, to an experimental animal. Such electronic devices typically require a power source, and experimental animal research may be further improved where such electronic devices have the capability to transfer data to a central system.

Powering electronic devices inside an enclosed cage using batteries presents potential issues when batteries become drained. Human operators may be required to change drained batteries, generating additional expense and potentially compromising experimental outcomes. Further, experimental data may be lost or compromised if a battery is fully drained prior to its changing. Additionally, the use of batteries on a large scale may be expensive. While power or data connections can be provided to in-cage electronic devices via wires, experimental animals are known to chew on electrical wiring, so reduction of exposed wiring may be desirable. And, it is difficult to provide conventional power and data connections to in-cage devices in a sterile fashion. Further, it would be advantageous to have an efficient and relatively cheap way to provide wired power and/or data connections to in-cage electronics en masse. While power and data can also be transmitted wirelessly, for example, through inductive charging and Bluetooth or Wi-Fi, respectively, such technology when used in many animal cages and many electrical devices may be prohibitively expensive and interference among a multitude of signals may cause additional issues.

Thus, it would be desirable to have a mechanism to provide power to, receive data from, and/or transmit data to electronic devices in experimental animal cages that is simple, efficient, reproducible, and/or relatively inexpensive.

SUMMARY

In one embodiment, a cage for housing at least one experimental animal is provided. The cage may include one or more walls that enclose a living space for at least one experimental animal with at least one wall comprising a plastic material. At least one electrical feedthrough may traverse the wall. The electrical feedthrough may include an internal electrical contact located inside the living space and an external electrical contact located outside the living space. The internal and external electrical contacts may electrically connected.

The cage may further include a first coupling member that includes the internal electrical contact and a second coupling member that includes the external electrical contact. The first and second coupling members may be mechanically interlocked to each other may provide electrical continuity between the internal and external electrical contacts.

The wall traversed by the at least one electrical feedthrough may have an aperture. At least one of the first coupling member and the second coupling member may include a projection that extends through the aperture, and the other of the first coupling member and the second coupling member may be adapted to interlock with the projection.

The projection may have a diameter that is greater than a diameter of the aperture. The projection may include at least one barb. The first coupling member may comprise a substantially hollow structure. The at least one barb may be disposed within the substantially hollow structure.

The at least one electrical feedthrough may include an electrical terminal that is adapted to conductively fasten to an electrical lead from an electronic device inside the living space. The electrical terminal may include the internal electrical contact.

At least one of the first coupling member or second coupling member may consist essentially of plated copper, copper alloy, plated steel, steel alloy, or galvanized steel. At least one of the internal or external electrical contacts may have a substantially dome-shaped or a substantially flat contact surface.

At least one of the first coupling member and the second coupling member may include a plurality of flaps, with the other including a plurality of slots corresponding to the flaps. The first and second coupling members may be adapted such that the flaps are extended through the slots and folded to interlock the first coupling member with the second coupling member.

The at least one electrical feedthrough may include at least one elastomeric seal that is disposed between the first coupling member and the second coupling member.

The at least one electrical feedthrough may consist essentially of plated copper, copper alloy, plated steel, steel alloy, or galvanized steel. At least one of the internal or external electrical contacts may have a substantially dome-shaped or a substantially flat contact surface A wall that is traversed by the at least one electrical feedthrough may have an aperture. The at least one electrical feedthrough may include a plurality of flaps. The flaps may extend through the aperture and may be folded against the wall to secure the feedthrough to the wall. The least one electrical feedthrough may include at least one elastomeric seal that is disposed against the at least one wall.

A thickness of the at least one wall traversed by the at least one electrical feedthrough may be less than 5 mm, 3 mm, and/or 1 mm. A volume of the cage may be less than 60 liters, 20 liters, or 10 liters.

In another embodiment, a system for monitoring at least one experimental animal is provided. The system may include a cage and an electronic monitor configured to receive the cage. The cage may include one or more walls that enclose a living space for at least one experimental animal. At least one of the one or more walls may include a plastic material. The cage may further include at least one electrical feedthrough that traverses one of the at least one wall. The at least one electrical feedthrough may include an internal electrical contact located inside the living space and an external electrical contact located outside the living space, the internal and external electrical contacts being electrically connected. The electronic monitor may include at least one monitor electrical contact configured to electrically connect to the at least one electrical feedthrough when the cage is received by the electronic monitor.

The electronic monitor may further include an arm. The arm may position the at least one monitor electrical contact such that it abuts the at least one electrical feedthrough when the cage is received by the electronic monitor.

In yet another embodiment, an electrical feedthrough for providing electrical continuity through a wall of a cage for housing an experimental animal is provided. The wall may be one of one or more walls that enclose a living space for the experimental animal. The electrical feedthrough may include a first coupling member and a second coupling member. The first coupling member may include an internal electrical contact, the first coupling member adapted to dispose the internal electrical contact inside the living space. The second coupling member may include an external electrical contact, the second coupling member adapted to dispose the external electrical contact outside the living space. The first and second coupling members may be adapted to mechanically interlock with each other and provide electrical continuity through the wall and between the internal and external electrical contacts.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments and aspects of the apparatuses and methods described herein and, together with the description, serve to explain the principles of the invention.

FIGS. 7A, 7B, and 7C are perspective unassembled, perspective assembled, and cross-sectional perspective assembled views, respectively, of an example of an embodiment of an electrical feedthrough.

DETAILED DESCRIPTION

An electronic monitor may be adapted to be removably coupled to a cage housing experimental animals, to be positioned in a predefined position relative to the cage, and monitor one or more of the experimental animals. The electronic monitor can be adapted to maintain a substantially sterile barrier between the animal living space in the cage and the environment external to the cage while the electronic monitor is coupled to the cage. Sterility refers to chemical and biological isolation from the ambient environment, such as, for example, isolation from foreign odors, soot particles, viruses, parasitic worm eggs, bacteria, prions, proteins, metabolites, parasitic mites and their eggs, and optionally also humidity and/or temperature fluctuations. The electronic monitor can thereby monitor the experimental animals while minimizing perturbations to the animals. Examples of such an electronic monitor and other related experimental animal monitoring instrumentalities are described in U.S. patent application Ser. No. 14/549,403 to Betts-LaCroix et al., U.S. patent application Ser. No. 14/788,749 to Heath et al., and U.S. patent application Ser. No. 14/871,966 to Betts-LaCroix et al., which are incorporated herein by reference in their entireties.

Figure 1:
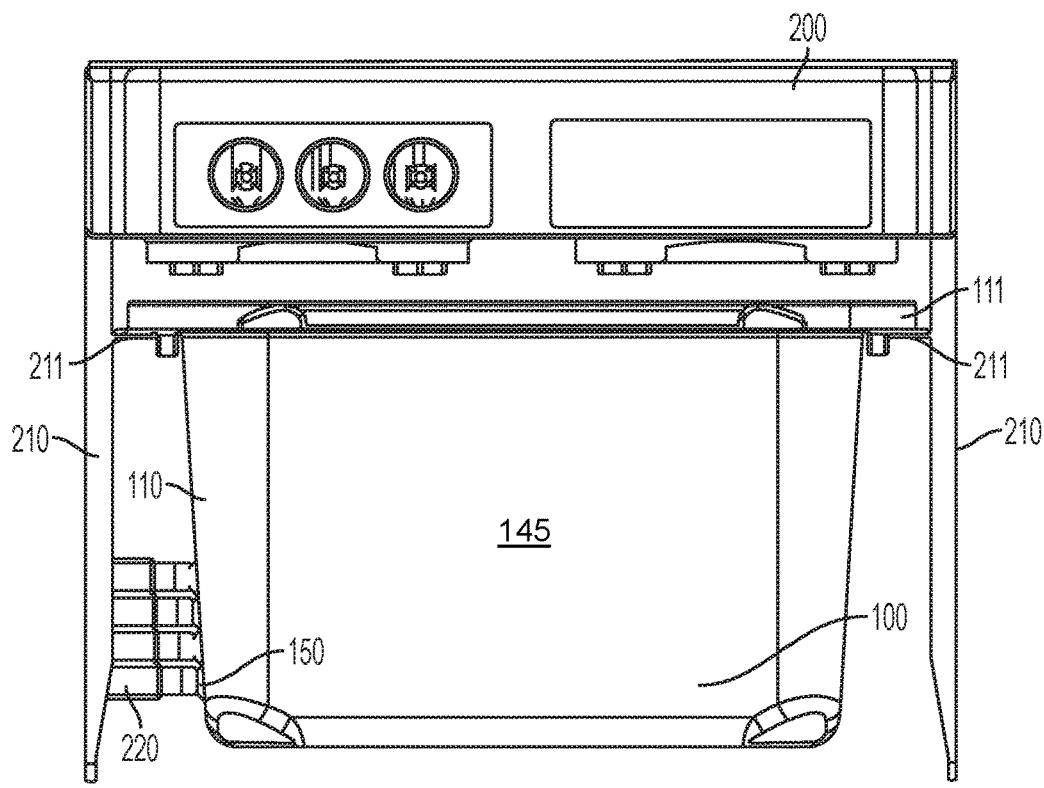
FIG. 1 is a front view of an example of an embodiment of a cage with a plurality of electrical feedthroughs electrically connected to an electronic monitor.

FIG. 1 illustrates an example of an embodiment of an electronic monitor 200 and a cage 100 that is coupled thereto. Cage 100 has one or more walls 110 that enclose a living space for experimental animals. In one embodiment, walls 110 define a living space that is approximately a rectangular prism. In other embodiments, however, walls 110 may have other shapes or dimensions. In illustrative examples, a mouse cage may be shaped and sized to house from one to about five mice, while a rat cage may be capable of housing up to about 10 mice. For example, mice may be housed singly or in pairs. In one embodiment, walls 110 of cage 100 enclose a substantially cuboid living space 145 of at least 10 cm×10 cm×5 cm. In various embodiments, cage 100 may have a volume less than 60 liters, less than 20 liters, or less than 10 liters.

Cage 100 may also include shaped features to provide water and/or food to the experimental animals. For example, cage 100 may have a water dispenser and/or a food dispenser. If cage 100 is of a disposable type, then water dispenser and/or food dispenser may be pre-filled with an amount of water or food corresponding to an expected lifespan of the animals, an expected timespan of an experiment, or a given interval between cage changes. A given interval between cage changes may be, for example, one, two, or four weeks, such as may be suitable for the particular types of cage, animal, and experiment.

Figure 3A:
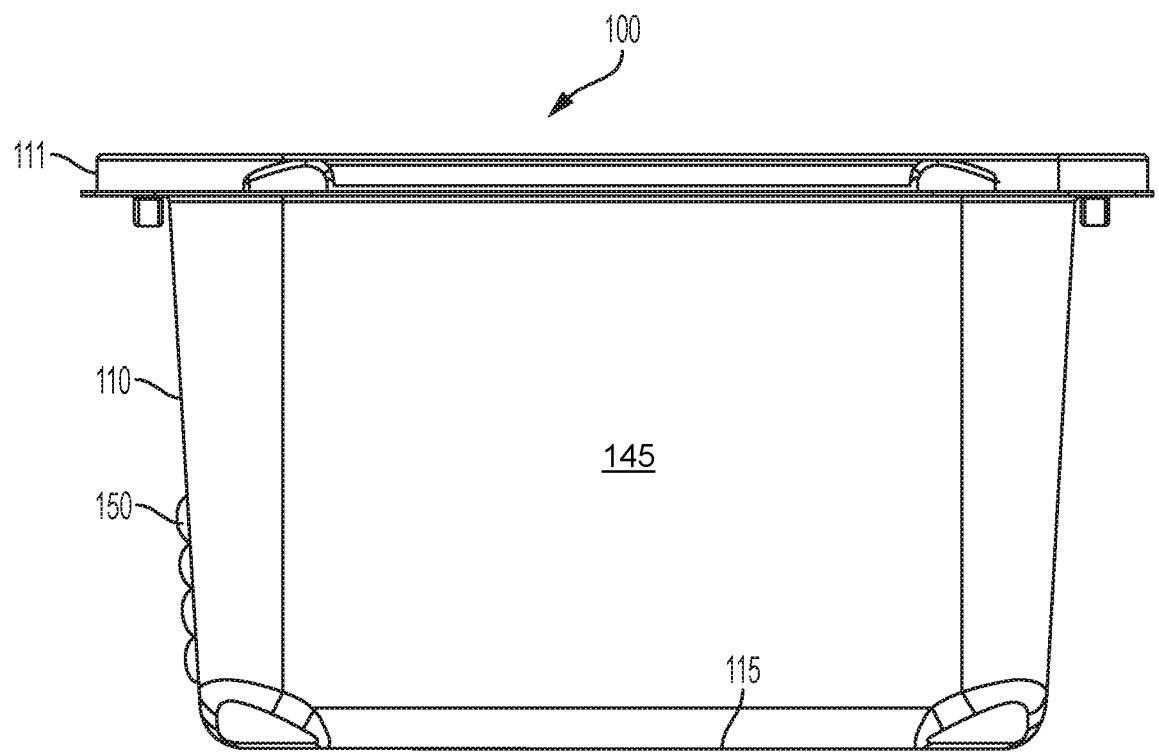
FIGS. 3A and 3B are front and three-dimensional perspective views, respectively, of an example of an embodiment of a cage with a plurality of electrical feedthroughs.
Figure 3B:
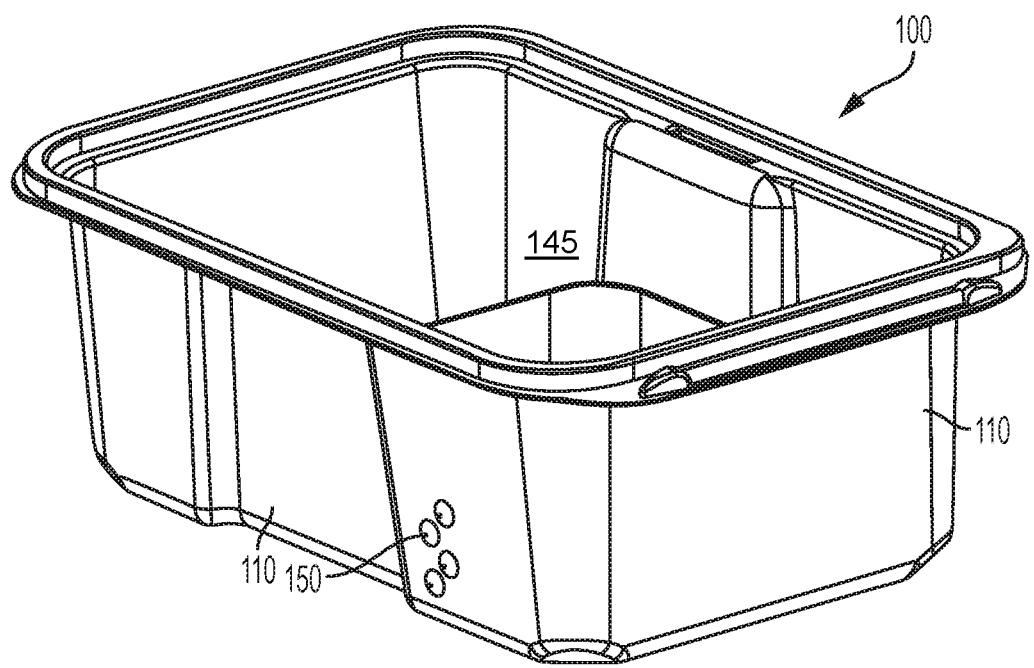

As depicted in FIGS. 3A and 3B, at least one wall 110 of cage 100 may have at least one electrical feedthrough 150 that permits electrical signals, for example, power or data signals, to traverse wall 110. In various embodiments, wall 110 traversed by at least one electrical feedthrough 150 may have a thickness of less than 5 mm, less than 3 mm, or even less than 1 mm. Cages with thinner walls may be less expensive to produce and have reduced weight, but may be not be as strong. Cage 100 may further comprise base 115 and one or more lip 111.

As shown in FIG. 1, electronic monitor 200 may include one or more monitor contacts 220 that are configured to electrically connect to one or more electrical feedthroughs 150 of cage 100. Monitor contacts 220 may, in some embodiments, be positioned to engage with electrical feedthroughs 150 via an arm 210 of electrical monitor 200. Electronic monitors 200 may be structurally adapted to permit easy and fast uncoupling of cages 100 from electronic monitors 200 by a human technician or even by a robot. For example, electronic monitors 200 may be structurally adapted to permit coupling and uncoupling by sliding cages 100 into and out of electronic monitors 100. To that effect, in some embodiments, arm 210, or alternatively another component of electrical monitor 200, may further comprise one or more support flanges 211. Via one or more protruding lips 111 and one or more support flanges 211, cage 100 may be securely mounted within electrical monitor 200.

Figure 2:
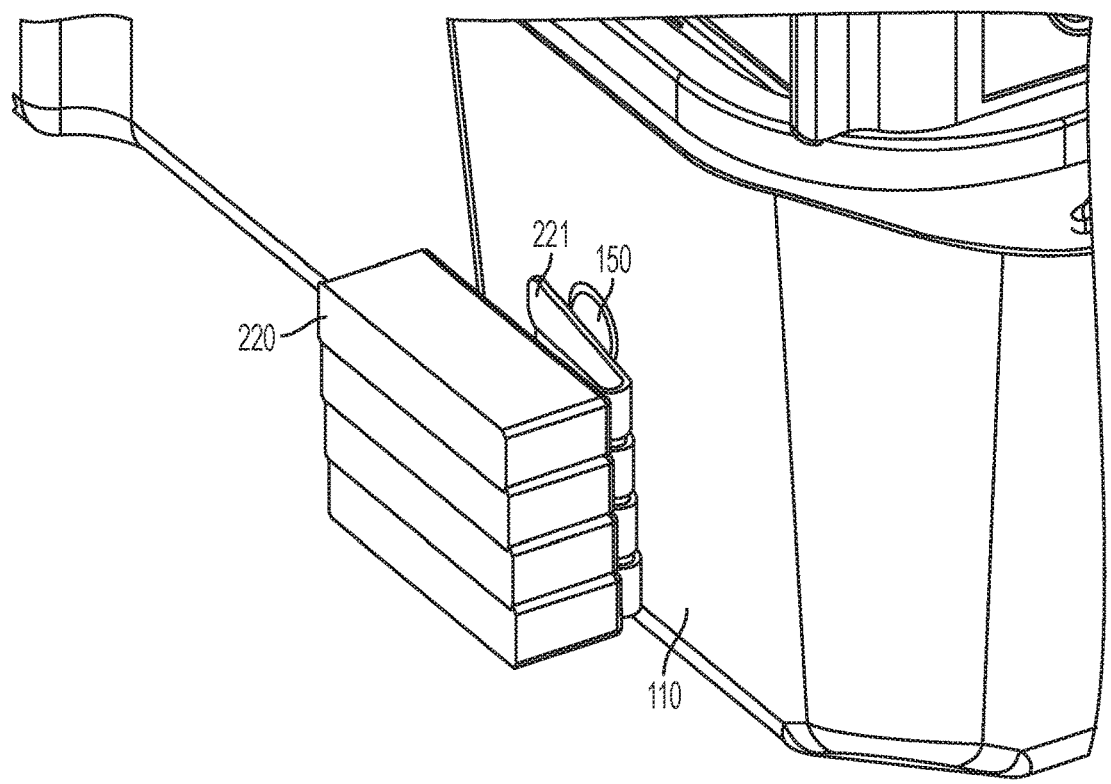
FIG. 2 is a partial perspective view of the example of FIG. 1.

FIG. 2 provides a perspective, zoomed-in view of the embodiment of FIG. 1, with arm 210 omitted for illustrative purposes. As shown, monitor contact 220 may further comprise contact element 211, which is configured to abut electrical feedthrough 150 in an electrically connected state.

Figure 4A:
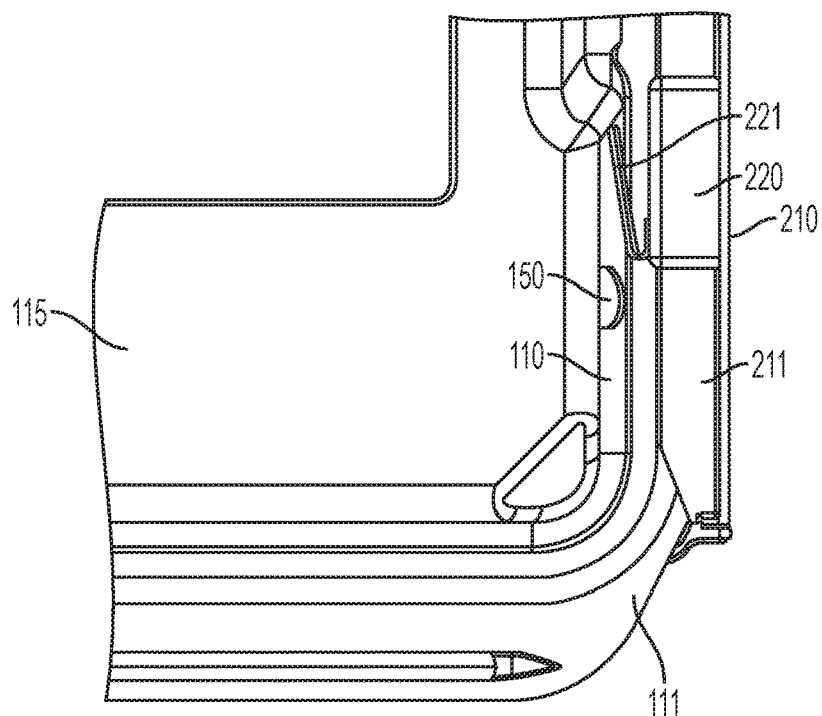
FIGS. 4A and 4B are sequential bottom views of an example of an embodiment of an electronic monitor receiving a cage.
Figure 4B:
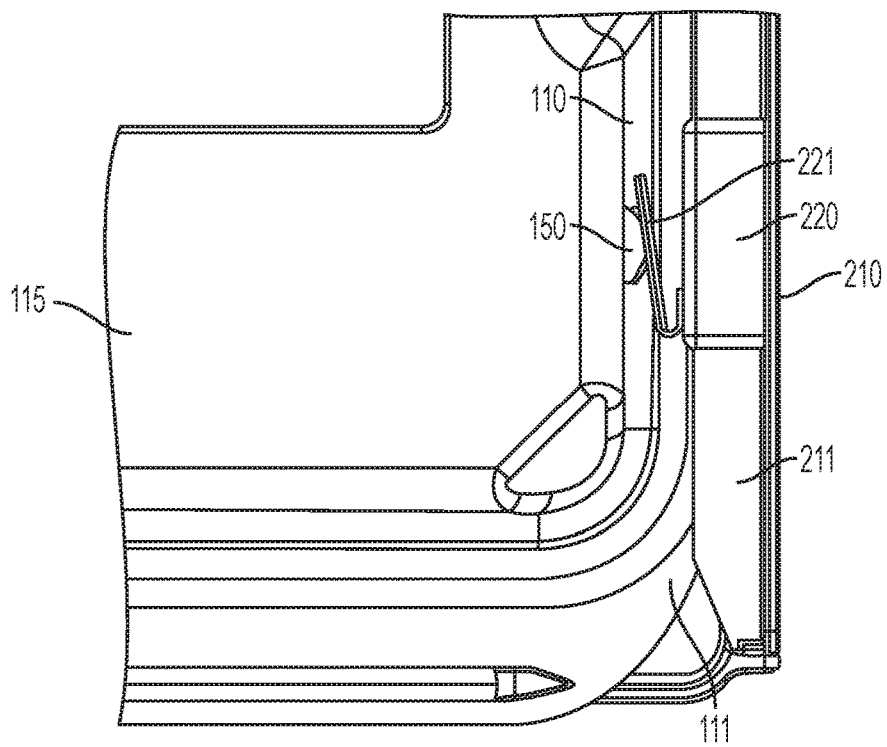

FIGS. 4A and 4B depict, consecutively, steps of engaging cage 100 with electronic monitor 200 in a manner that electrically connects monitor contacts 220 to electrical feedthroughs 150, according to an exemplary embodiment. Conversely, FIGS. 4B and 4A depict, consecutively, steps of disengaging cage 100 from electronic monitor 200. In both FIGS. 4A and 4B, cage 100 and electronic monitor 200 are viewed from the bottom. As shown in FIG. 4A, cage 100 is partially mounted within electronic monitor 200, with lip 111 of cage 100 supported by support flange 211. As shown in FIG. 4A, electrical feedthrough 150 is not in contact with monitor contact 220, including its contact element 211.

As shown in FIG. 4B, cage 100 is fully mounted within electrical monitor 200. There, lip 111 of cage 100 is slid further onto support flange 211. In some embodiments, electronic monitor 200 and/or cage 100 may comprise additional mechanical or magnetic components to prevent cage 100 from being pushed too far with respect to electronic monitor 200. In other embodiments, multiple electronic monitors 200 may be mounted on a rack that may include mechanical or magnetic components to serve this purpose. With cage 100 fully mounted in electronic monitor 200, electrical feedthrough 150 may electrically connect with monitor contact 220, for example via a mechanical connection with contact element 221. As depicted, contact element 221 may be a spring-loaded sliding contact that presses on electrical feedthrough 150 when appropriately positioned. However, in other embodiments, contact element 221 may be another type of suitable sliding contact, such as, for example, conductive brushes, or pogo pins. As depicted, the portion of electrical feedthrough 150 external to cage 100 may be substantially dome-shaped, but in other embodiments, this portion of electrical feedthrough(s) 150 may be substantially flat or may be another type of suitable sliding contact. In yet other embodiments, the portion of electrical feedthrough(s) 150 external to cage 100 may include a spring, brush, pogo pin, or the like; and contact element(s) 221 may be a substantially dome-shaped, substantially flat, or differently-shaped sliding element.

In other embodiments, such as if electronic monitor 200 is configured differently to wrap around the sides of cage 100, arm 210 may be omitted or may be oriented in a different and suitable manner.

In yet other embodiments, electrical feedthrough(s) 150 may be positioned on the back, top, and or bottom, of cage 100 rather than, or in addition to, being positioned on the side of cage 100 as shown in FIGS. 1-4B. In such embodiments, electrical feedthrough(s) 150 may still be configured to electronically connect with monitor contact(s) 220 upon cage 100 being mounted in electrical monitor 200. Here, contact element(s) 221 may comprise spring-loaded pins that serve to make reliable electrical connections with corresponding electrical feedthrough(s) 150 via applied pressure. Here, electrical feedthrough(s) 150 may be, for example, substantially dome-shaped, substantially flat, or substantially cup-shaped. In yet another embodiment, electrical feedthrough(s) 150 may comprise spring-loaded pins and corresponding contact element(s) 221 may comprise substantially dome-shaped, substantially flat, or substantially cup-shaped contacts.

Figure 5A:
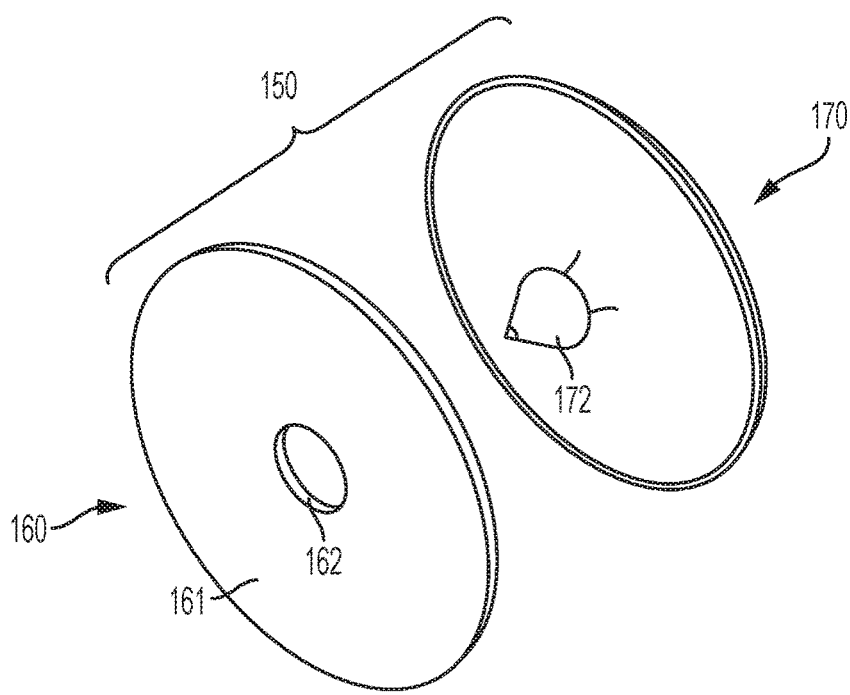
FIGS. 5A, 5B, and 5C are perspective unassembled, side unassembled, and cross-sectional assembled views, respectively, of an example of an embodiment of an electrical feedthrough.
Figure 5B:
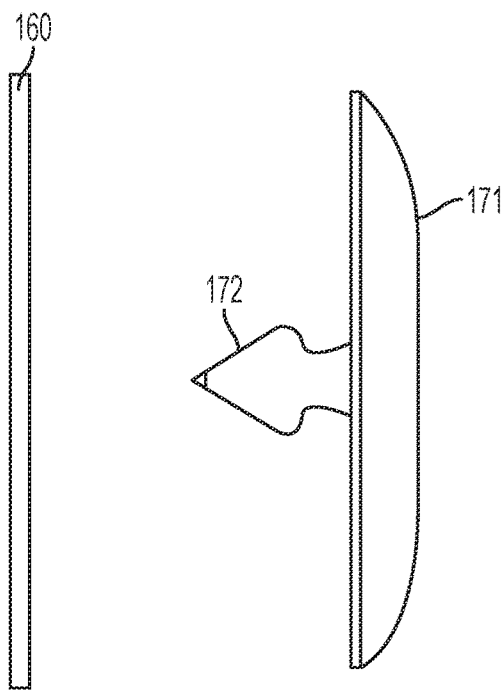
Figure 5C:
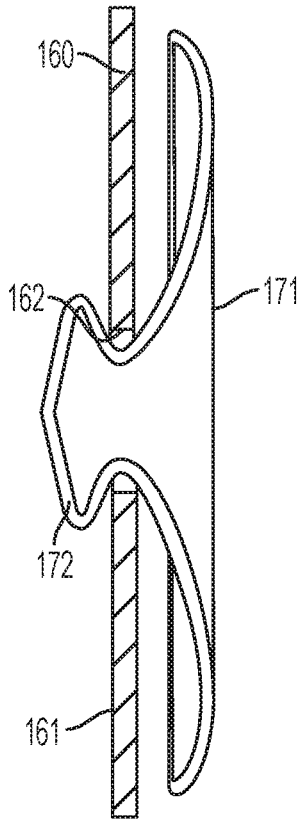

FIGS. 5A-5C are illustrations of an embodiment of electrical feedthrough 150 with a compressible post 172. Post 172 may be adapted to be compressible, for example, by being made of a thin sheet of metal, being made of a substantially malleable conductive material, and/or having slits (not shown) that are substantially perpendicular to the direction of compression. Here, electrical feedthrough 150 may comprise an internal coupling member 160 and an external coupling member 170. Internal coupling member 160 may comprise opening 162 and internal electrical contact 161. External coupling member 170 may comprise external electrical contact 171 and compressible post 172. Electrical feedthrough 150 may consist essentially of plated copper, copper alloy, plated steel, steel alloy, and/or galvanized steel. FIGS. 5A and 5B depict a perspective view and a side view, respectively, of an embodiment of electrical feedthrough 150 with compressible post 172, wherein internal coupling member 160 and external coupling member 170 have not been engaged. FIG. 5C depicts a cross-sectional side view of electrical feedthrough 150 with compressible post 172, wherein internal coupling member 160 and external coupling member 170 are engaged. As shown, compressible post 172 has been projected through opening 162 and compressed. When sufficiently compressed, the diameter of compressible post 172 is greater than the diameter of opening 162, thereby ensuring that internal coupling member 160 and external coupling member 170 remain mechanically engaged and preferably providing multiple points of electrical connection between coupling members 160, 170.

Figure 6A:
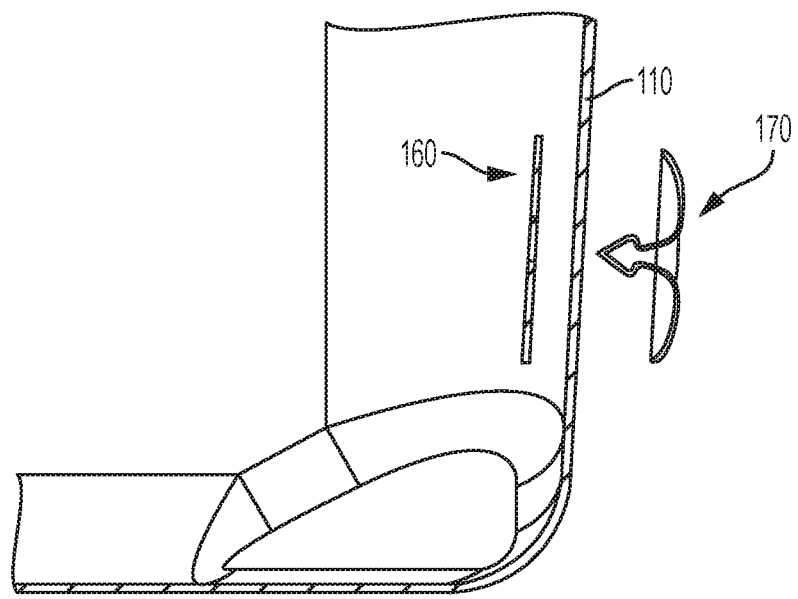
FIGS. 6A, 6B, 6C, and 6D are sequential cross-sectional views of an example of an embodiment of a process for installing the electrical feedthrough of FIGS. 5A-5C in a cage.
Figure 6B:
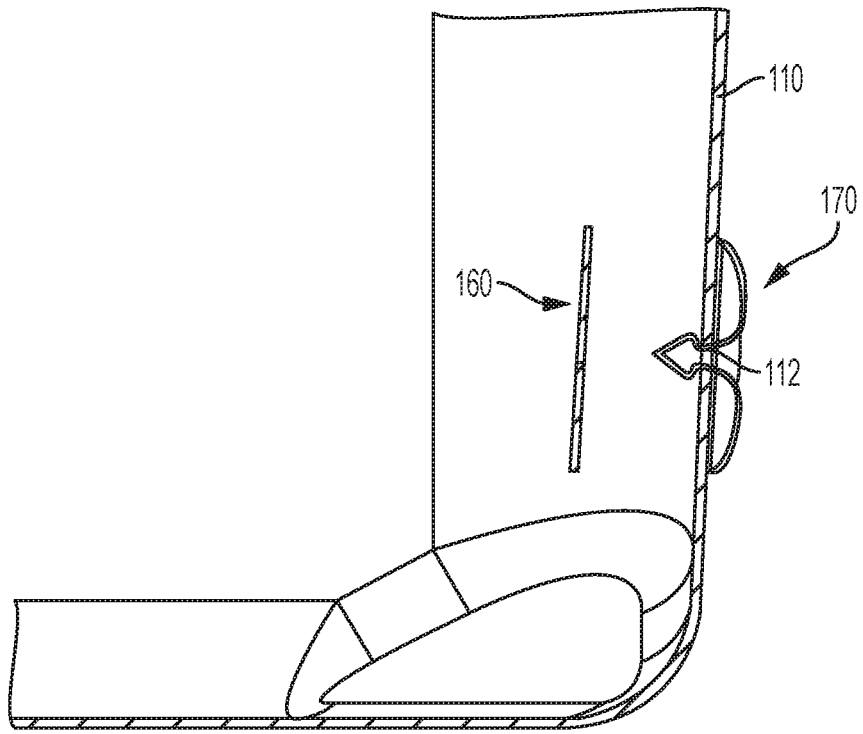
Figure 6C:
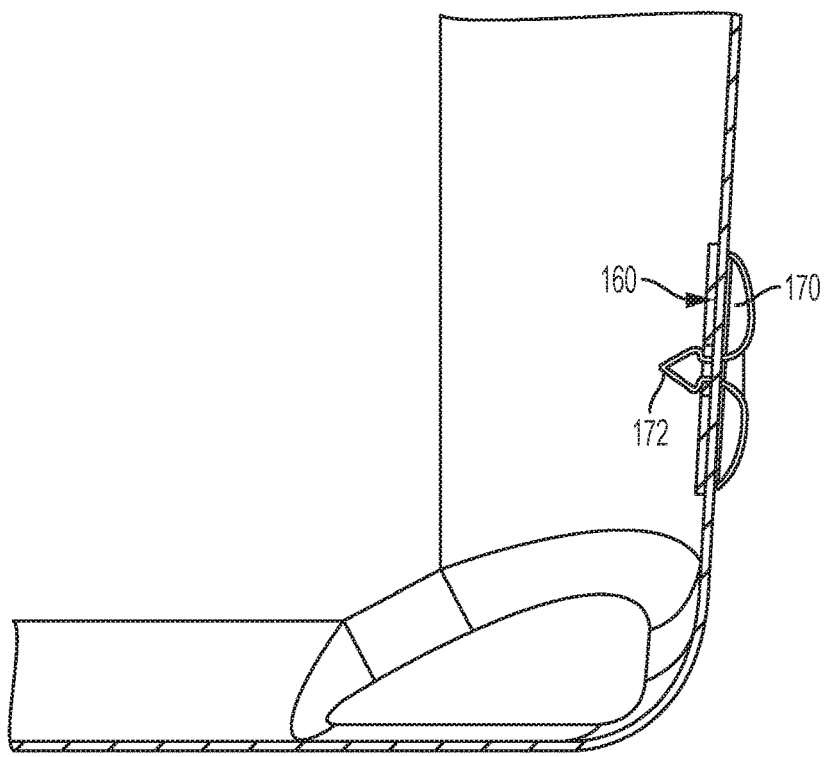
Figure 6D:
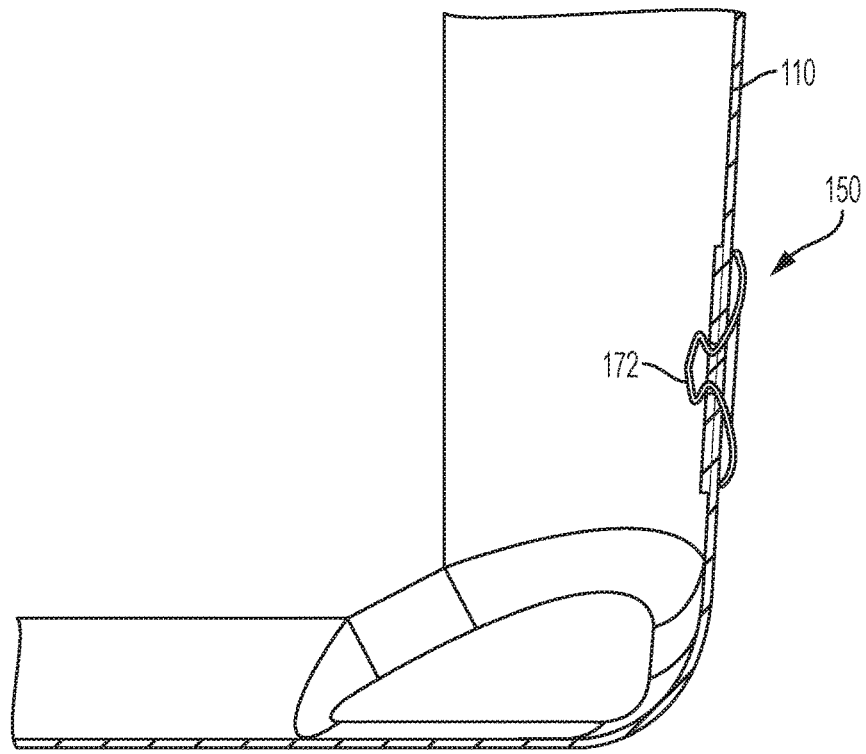

FIGS. 6A-6D are cross-sectional illustrations of an embodiment of a method of installing electrical feedthrough 150 with compressible post 172 in cage 100. First, as shown in FIG. 6A, external coupling member 170 may be positioned on the outside of wall 110, with respect to the living space of cage 100, at a location of wall 110 where electrical feedthrough 150 is desired. Second, as shown in FIG. 6B, external coupling member 170 may be pressed against wall 110 until compressible post 172 punches through and traverses wall 110, creating aperture 112 in wall 110. In alternative embodiments, aperture 112 may be drilled, melted, or created in wall 110 by another suitable method, and compressible post 172 may be subsequently projected through aperture 112. Preferably, the diameter of compressible post 172, after being compressed, is greater than the diameter of aperture 112. Third, as shown in FIG. 6C, internal coupling member 160 may be placed upon external coupling member 170 such that compressible post 172 traverses opening 162 of internal coupling member 160. Finally, as shown in FIG. 6D, compressible post 172 is compressed via a vice or another method known in the art, such that external coupling member 170 and internal coupling member 160 are interlocked with one another and the installed electrical feedthrough 150 traverses and is secured upon wall 110. External electrical contact 171 may then be used to electrically contact with monitor contact 220. Internal electrical contact 161 and/or portions of compressed compressible post 172 may be used to electrically contact with an electronic device 180 within the living space of cage 100. As non-limiting examples, electronic device 180 may comprise, for example, an electronic scale, a heart-rate monitor, an acoustic speaker, an acoustic sensor, a vibrator, an accelerometer for measuring vibration or impulses, a pulse-ox sensor, a food dispenser, a stimulus generator, and/or any other electronic device suitable for experimental animal research. Internal electrical contact 161 and/or portions of compressed compressible post 172 may thereby comprise an electrical terminal that may conductively fasten to an electrical lead 181 from such an electronic device 180.

Figure 6E:
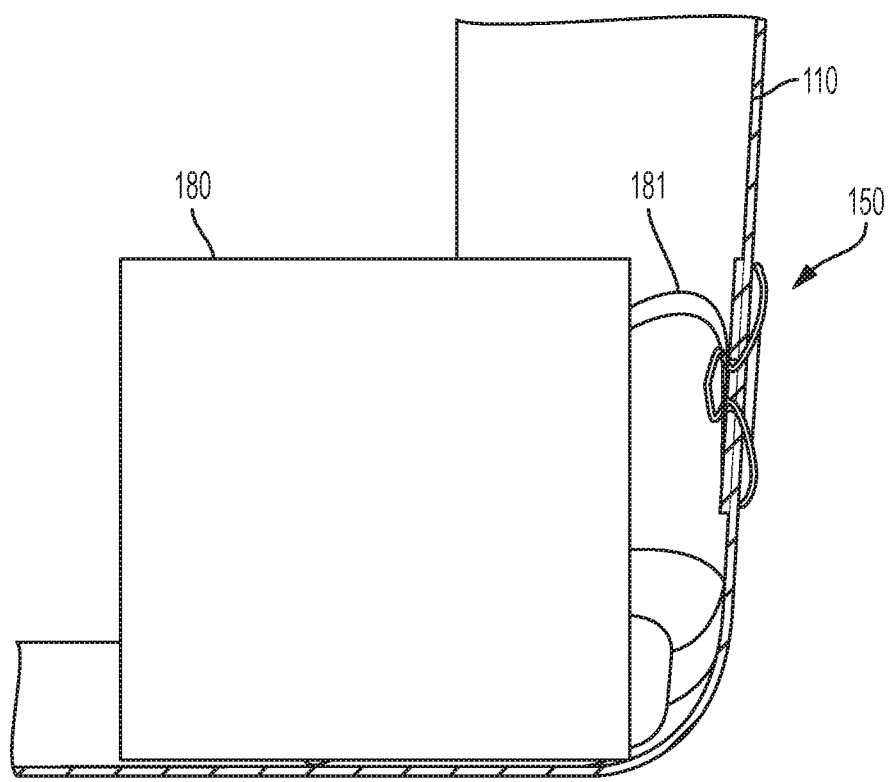
FIG. 6E is a cross-sectional view of an example of an embodiment of an electronic device with an electrical lead coupled to an installed embodiment of the electrical feedthrough of FIGS. 5A-5C.

As shown in FIG. 6E, electrical lead 181 may be used to electrically connect and/or mechanically secure electronic device 180 to the electrical terminal. As shown, electrical lead 181 may be a forked member that secures itself about an exposed portion of the electrical terminal, such as the neck of compressible post 172, while electronic device 180 is placed into cage 100. In other embodiments, electrical lead 181 may comprise, for example, a clamp, spring loaded clamp, a pogo pin, a piece of wire that may be wrapped around or fed through a portion of electrical feedthrough 150, a member that pierces an exposed portion of electrical feedthrough 150, and/or any mass-producible electrical connection component suitable for this purpose.

FIGS. 7A-7C are illustrations of an embodiment of electrical feedthrough 150 with flaps 174. Here, electrical feedthrough 150 may again comprise internal coupling member 160 and external coupling member 170. Internal coupling member 160 may comprise a plurality of slots 163 and internal electrical contact 161. External coupling member 170 may be substantially dome-shaped and may comprise external electrical contact 171 and a plurality of flaps 174. Electrical feedthrough 150 may consist essentially of plated copper and/or galvanized steel. FIG. 7A depicts an unassembled perspective view of an embodiment of electrical feedthrough 150 with flaps 174, wherein internal coupling member 160 and external coupling member 170 have not been engaged. FIGS. 7B and 7C depict perspective and cross-sectional perspective views, respectively, of an embodiment of electrical feedthrough 150 with flaps 174, wherein internal coupling member 160 and external coupling member 170 are engaged. As shown, flaps 174 have been projected through corresponding slots 163 and folded against internal electrical contact 161. This may ensure that internal coupling member 160 and external coupling member 170 remain mechanically engaged and may provide multiple points of electrical connection between the coupling members 160, 170. Such flaps 174 may be folded such that they point substantially perpendicular to their initial projecting direction and substantially parallel to internal electrical contact 161.

Figure 8A:
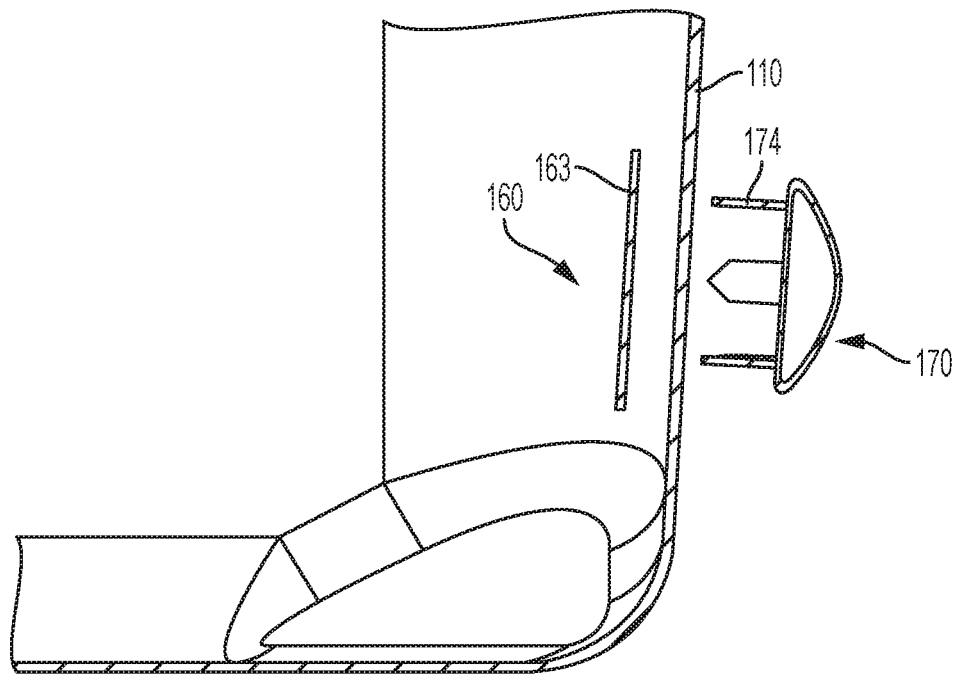
FIGS. 8A, 8B, 8C, and 8D are sequential cross-sectional views of an example of an embodiment of a process for installing the electrical feedthrough of FIGS. 7A-7C in a cage.
Figure 8B:
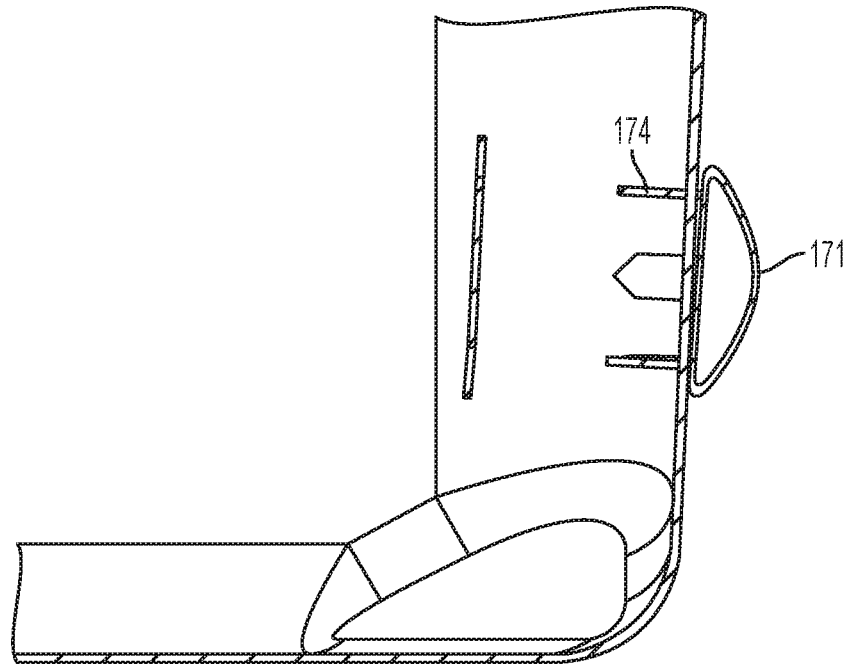
Figure 8C:
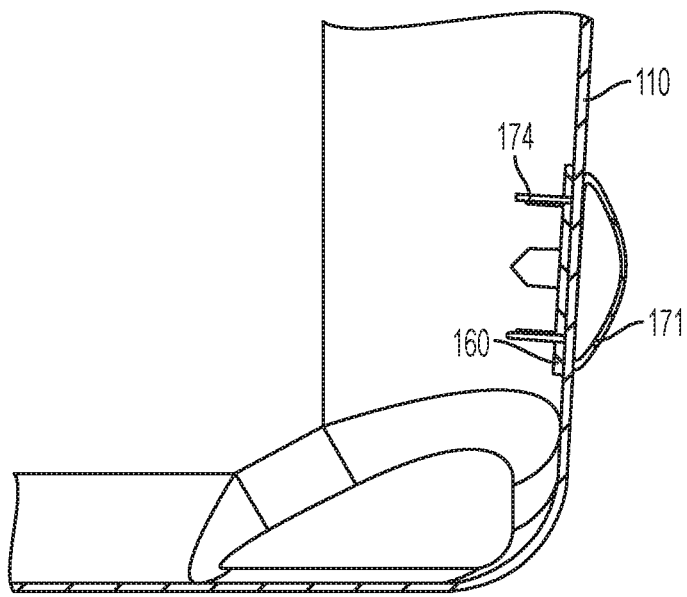
Figure 8D:
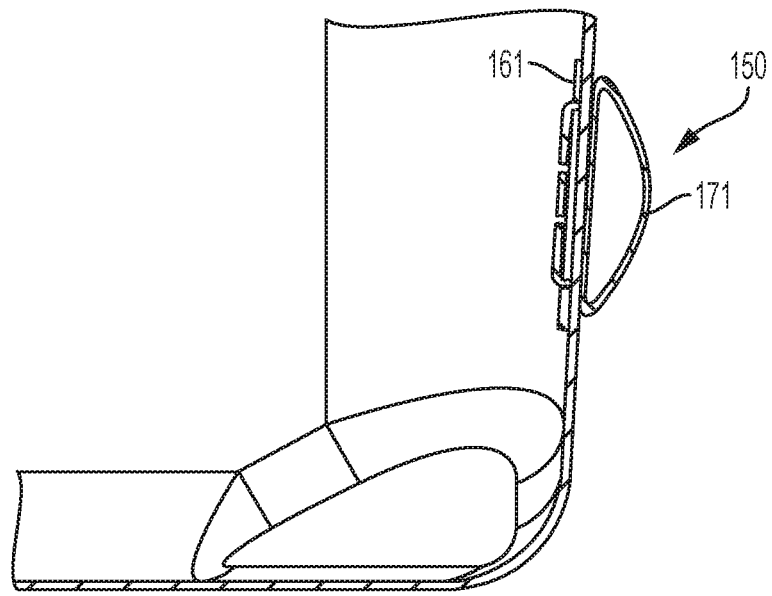

FIGS. 8A-8D are cross-sectional illustrations of an embodiment of a method of installing electrical feedthrough 150 with flaps 174 in a wall 110 of cage 100. First, as shown in FIG. 8A, external coupling member 170 may be positioned on the outside of wall 110 where electrical feedthrough 150 is desired. Second, as shown in FIG. 8B, external coupling member 170 may be pressed against wall 110 until flaps 173 punch through and traverse wall 110, creating a plurality of apertures 112 in wall 110. To facilitate this, flaps 174 may each comprise a pointed or angled tip, as depicted, for example, in FIG. 7A. In alternative embodiments, such apertures 112 may be drilled, melted, or otherwise created in wall 110 and flaps 174 may be subsequently projected through apertures 112. Third, as shown in FIG. 8C, internal coupling member 160 may be placed on external coupling member 170 such that flaps 174 align with and ultimately project through slots 163 of internal coupling member 160. Finally, as shown in FIG. 7D, flaps 174 may be folded inward, or alternatively outward, using a vice, pliers, or another suitable method, such that external coupling member 170 and internal coupling member 160 are interlocked with each other and the installed electrical feedthrough traverses and is secured on wall 110. External electrical contact 171 may then be used to electrically contact monitor contact 220. Internal electrical contact 161 and/or portions of folded flaps 174 may be used to electrically connect to an electronic device 180 within the living space of cage 100. Internal electrical contact 161 and/or portions of folded flaps 174 may also have an electrical terminal that may conductively fasten to an electrical lead 181 from such an electronic device 180.

Figure 9A:
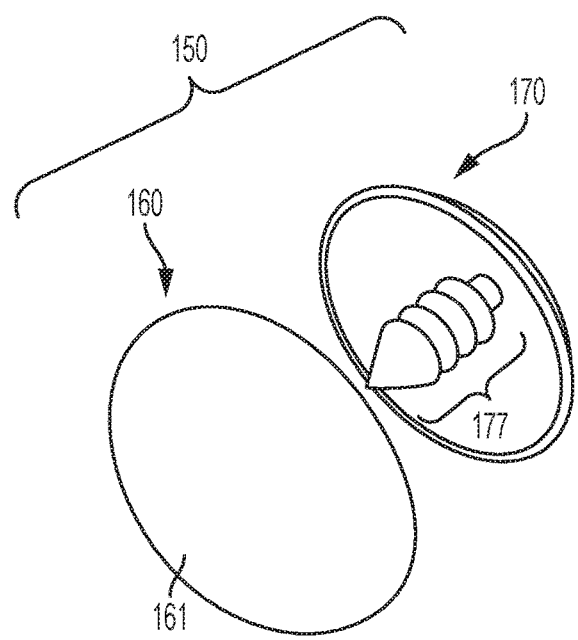
FIGS. 9A, 9B, 9C, and 9D are perspective unassembled, cross-sectional perspective unassembled, cross-sectional assembled, and cross-sectional unassembled views, respectively, of an example of an embodiment of an electrical feedthrough.
Figure 9B:
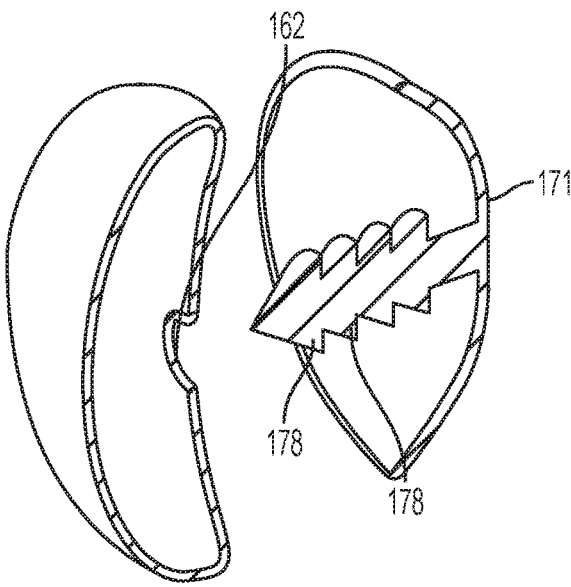
Figure 9C:
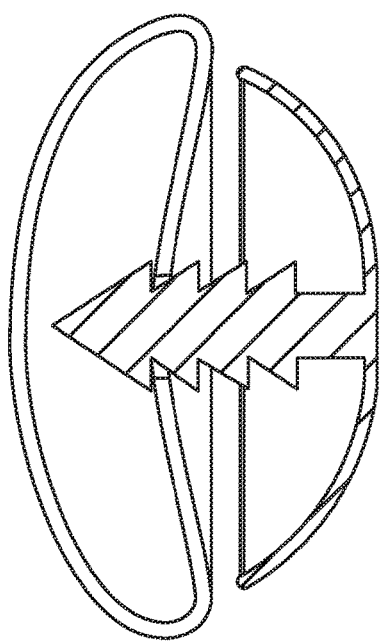
Figure 9D:
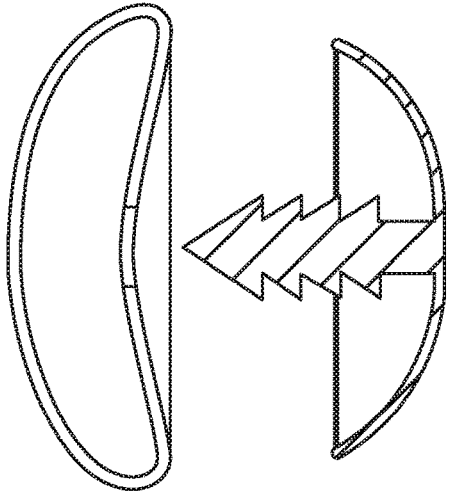

FIGS. 9A-9D are illustrations of an embodiment of electrical feedthrough 150 with an annular (i.e., straight) thread 177. Electrical feedthrough 150 may yet again comprise internal coupling member 160 and external coupling member 170. Internal coupling member 160 may be a substantially hollow structure and may comprise opening 162 and internal electrical contact 161. External coupling member 170 may comprise external electrical contact 171 and annular thread 177, which in turn may include multiple barbs 178. Electrical feedthrough 150 may consist essentially of plated copper and/or galvanized steel. FIGS. 9A, 9B, and 9D depict a cross-sectional perspective view and cross-sectional side views, respectively, of an embodiment of electrical feedthrough 150 with annular thread 177, wherein internal coupling member 160 and external coupling member 170 have not been engaged. FIG. 9C depicts a side cross-sectional view of electrical feedthrough 150 with annular thread 177, wherein internal coupling member 160 and external coupling member 170 are engaged. As shown, annular thread 177, including at least one barb 178, has been projected through opening 162 and into the hollow structure of internal coupling member 160. The diameter of the at least one last barb 178 is greater than the diameter of opening 162, thereby ensuring that internal coupling member 160 and external coupling member 170 remain mechanically engaged and preferably providing multiple points of electrical connection between coupling members 160, 170.

Figure 10A:
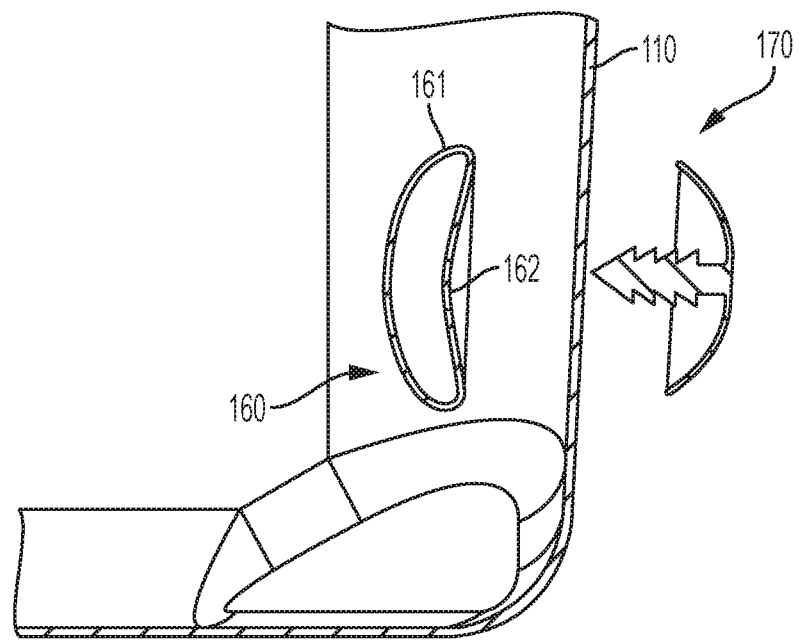
FIGS. 10A, 10B, and 10C are sequential cross-sectional views of an example of an embodiment of a process for installing the electrical feedthrough of FIGS. 7A-7C in a cage.
Figure 10B:
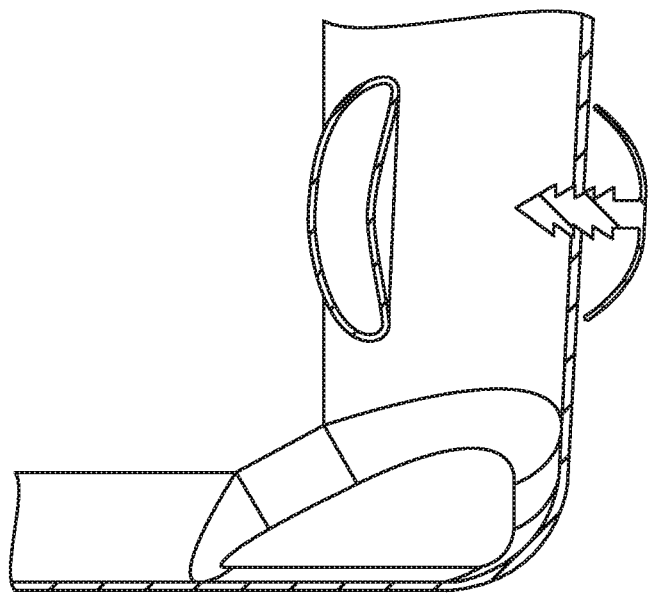
Figure 10C:
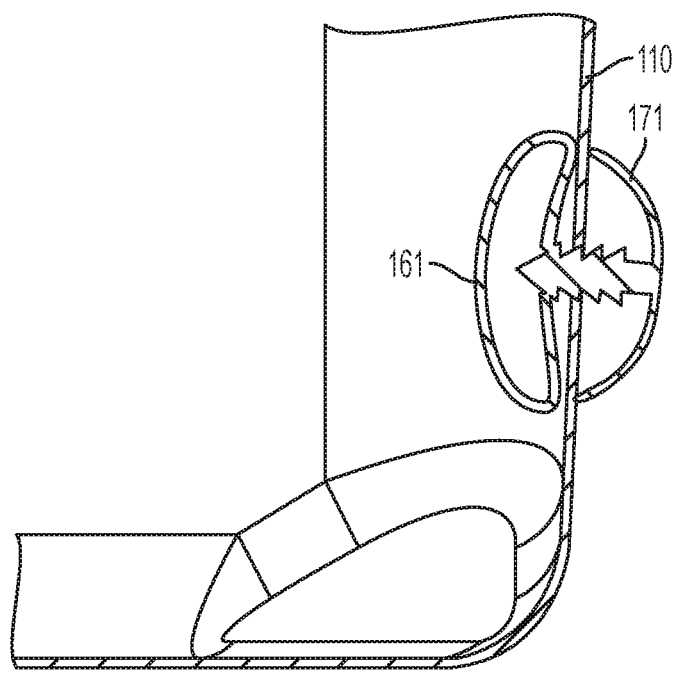

FIGS. 10A-10C are cross-sectional illustrations of an embodiment of a method of installing electrical feedthrough 150 with annular thread 177 in cage 100. First, as shown in FIG. 10A, external coupling member 170 may be positioned on the outside of wall 110 where electrical feedthrough 150 is desired. Second, as shown in FIG. 10B, external coupling member 170 may be pressed against wall 110 until annular thread 177 punches through and traverses wall 110, creating aperture 112 in wall 110. In alternative embodiments, aperture 112 may be drilled, melted, or otherwise created in wall 110 and annular thread 177 may be projected through aperture 112.

Third, as shown in FIG. 10C, internal coupling member 160 may be placed upon external coupling member 170 such that at least one barb 178 of annular thread 177 traverses opening 162 of internal coupling member 160. During this step, annular thread 177 may be guided into opening 162 via the pointed portion of at least one barb 178, with the angled portion of barb 178 mechanically pushing opening 162 to open further. Once the entirety of at least one barb 178 is forced through opening 162 and into the hollow structure of internal coupling member 160, the mechanical pressure pushing opening 162 further open in removed and the internal surface of internal coupling member 160 that surrounds opening 162 prevents barb 178 from exiting the internal coupling member 160. Thus, coupling members 160, 170 may be interlocked with each other and installed electrical feedthrough 150 traverses and is secured on wall 110. Such an attachment may be accomplished by hand, with a vice, and/or by another suitable method.

Once assembled, elastic force generated by the engagement of internal coupling member 160 and external coupling member 170 to each other via wall 110 may cause external coupling member 170 and internal coupling member 160 to snugly press against opposite sides of wall 110, thereby securing electrical feedthrough 150. This same mechanical pressure may serve to ensure a sufficient electrical contact between the internal surface of internal coupling member 160 that surrounds opening 162 and barb 178. Thus, external electrical contact 171 may then be used to electrically connect to monitor contact 220. Internal electrical contact 161 may be used to electrically contact with an electronic device 180 within the living space of cage 100. Internal electrical contact 161 may also comprise an electrical terminal that may conductively fasten to an electrical lead 181 from such an electronic device 180.

Figure 10D:
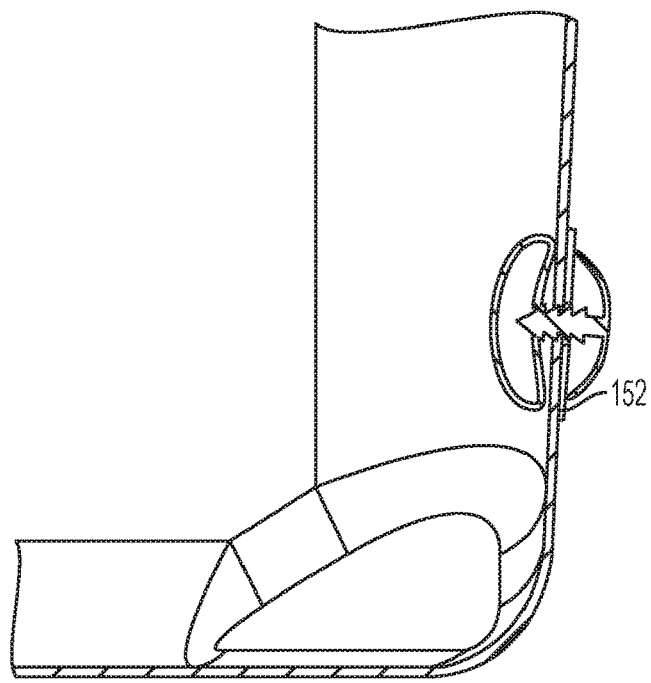
FIGS. 10D and 10E are cross-sectional views of examples of embodiments of an installed electrical feedthrough including an elastomeric seal.
Figure 10E:
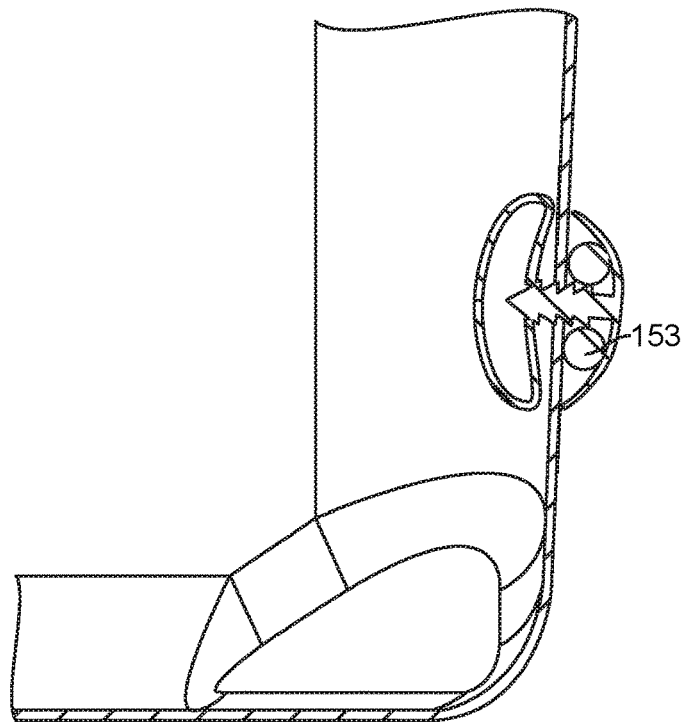

FIGS. 10D and 10E are cross-sectional illustrations of an embodiment of an electrical feedthrough 150 installed in cage 100, wherein electrical feedthrough 150 further comprises an elastomeric seal. As shown in FIG. 10D or 10E, respectively, the elastomeric seal may comprise, for example, a rubber gasket 152 or an O-ring 153. Such an elastomeric seal may serve to prevent gases, liquids, odors, or the like from traversing aperture 112 of wall 110. One or more elastomeric seals may be disposed between external coupling member 170 and wall 110, between internal coupling member 160 and wall 110, and/or between external coupling member 170 and internal coupling member 160. Although such elastomeric seal is depicted with respect to embodiments of electrical feedthrough 150 with annular thread 177 in FIGS. 10D and 10E, it is to be understood that such an elastomeric seal may be incorporated into other electrical feedthrough 150 embodiments disclosed herein.

This disclosure further contemplates alternative embodiments wherein the internal coupling member 160 comprises the projecting element (e.g., compressible post 172, flaps 174, and/or annular thread 177), and the external coupling member 170 comprises the receiving element (e.g., opening 162 or slots 163).

Figure 11:
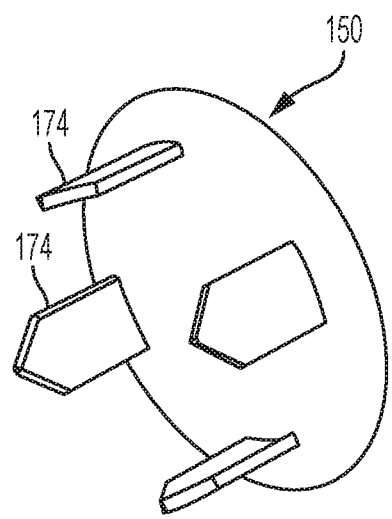
FIG. 11 is a perspective view of an example of an embodiment of an uninstalled electrical feedthrough.

FIG. 11 is a perspective view of another embodiment of electrical feedthrough 150 with flaps 174. Here, electrical feedthrough 150 may consist essentially of a single integral member that comprises both an internal electrical contact and an external electrical contact. Electrical feedthrough 150 may further comprise a plurality of flaps 174. Electrical feedthrough 150 may consist essentially of plated copper and/or galvanized steel. As shown, flaps 174 may have pointed tips, but in other embodiments such tips may be flat or rounded.

Figure 12A:
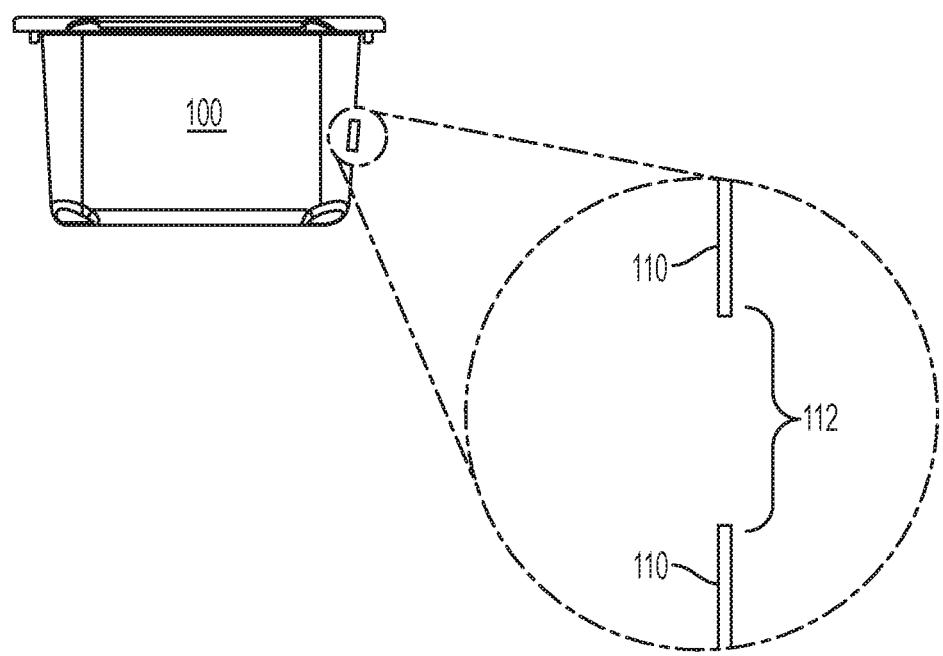
FIGS. 12A, 12B, and 12C are sequential cross-sectional views of an example of an embodiment of a process for installing the electrical feedthrough of FIG. 11 in a cage.
Figure 12B:
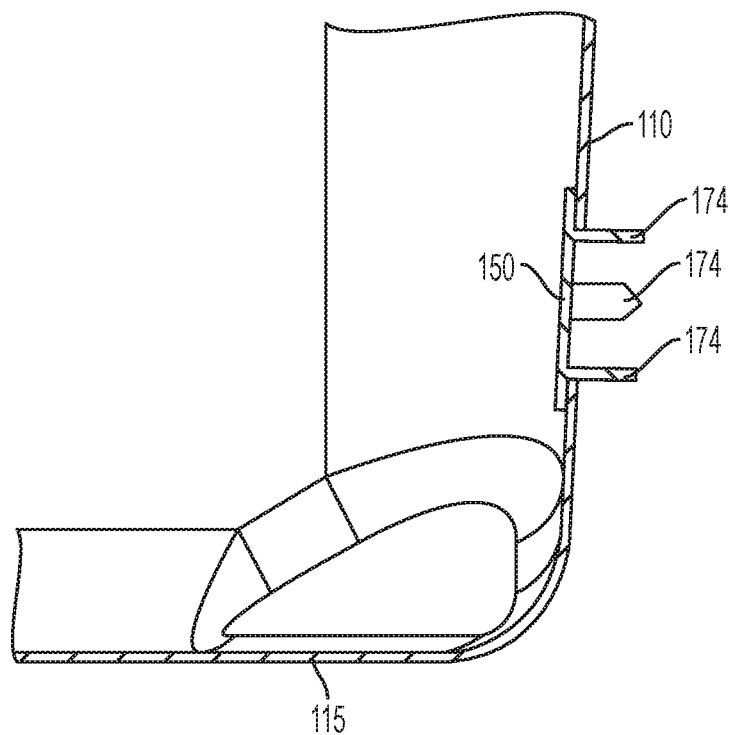
Figure 12C:
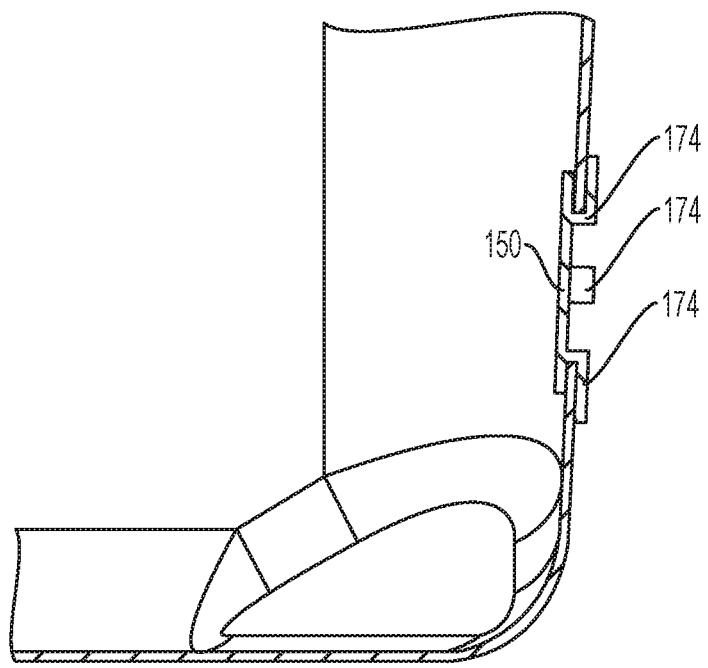

FIGS. 12A-12C are cross-sectional illustrations of an embodiment of a method of installing alternative electrical feedthrough 150 with flaps 174 in wall 110 of cage 100. First, as shown in FIG. 12A, aperture 112 may created. Aperture 112 may be punched, drilled, melted, or otherwise created in wall 110 where electrical feedthrough 150 installation is desired. In this embodiment, aperture 112 should be large enough to receive all of flaps 174, but should have a diameter smaller than that of the larger surface of electrical feedthrough 150. Second, as shown in FIG. 12B, electrical feedthrough 150 may be placed against wall 110 such that flaps 174 project through aperture 112. As depicted, the larger surface of electrical feedthrough 150 may be placed within the living area of cage 100 against the interior surface of wall 110, with flaps 174 traversing wall 110 and projecting outside of the living area. Alternatively, the larger surface of electrical feedthrough 150 may be placed against the exterior of wall 110, with flaps 174 traversing wall 110 and projecting into the living area. Then, as shown in FIG. 12C, flaps 174 may be folded outward, such as using a vice, pliers, or another suitable method, such that flaps 174 may be snugly positioned against wall 110. In this manner, electrical feedthrough 150 may be secured on wall 110. In some embodiments, one or more elastomeric seals may be disposed between the larger surface of electrical feedthrough 150 and wall 110, for example, encircling flaps 174.

Although the foregoing embodiments have been described in detail by way of illustration and example for purposes of clarity of understanding, it will be readily apparent to those of ordinary skill in the art in light of the description herein that certain changes and modifications may be made thereto without departing from the spirit or scope of the appended claims. It is also to be understood that the terminology used herein is for the purpose of describing particular aspects only, and is not intended to be limiting, since the scope of the present invention will be limited only by the appended claims.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of ordinary skill in the art upon reading this disclosure, each of the individual aspects described and illustrated herein has discrete components and features which may be readily separated from or combined with the features of any of the other several aspects without departing from the scope or spirit of the disclosure. Any recited method can be carried out in the order of events recited or in any other order that is logically possible. Accordingly, the preceding merely provides illustrative examples. It will be appreciated that those of ordinary skill in the art will be able to devise various arrangements which, although not explicitly described or shown herein, embody the principles of the disclosure and are included within its spirit and scope.

Furthermore, all examples and conditional language recited herein are principally intended to aid the reader in understanding the principles of the invention and the concepts contributed by the inventors to furthering the art, and are to be construed without limitation to such specifically recited examples and conditions. Moreover, all statements herein reciting principles and aspects of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary configurations shown and described herein.

In this specification, various preferred embodiments have been described with reference to the accompanying drawings. It will be apparent, however, that various other modifications and changes may be made thereto and additional embodiments may be implemented without departing from the broader scope of the claims that follow. The specification and drawings are accordingly to be regarded in an illustrative rather than restrictive sense.

We claim:

1. A cage for housing at least one experimental animal, the cage comprising:
   one or more walls that enclose a living space for at least one experimental animal, at least one of the one or more walls comprising a plastic material; and
   at least one electrical feedthrough that traverses the at least one wall, the at least one electrical feedthrough comprising:
      an internal electrical contact located inside the living space;
      an external electrical contact located outside the living space; and
      a compressible post interlocking the internal and external electrical contacts with each other, the compressible post configured to inelastically expand in diameter when compressed, the internal and external electrical contacts being electrically connected through the compressible post.

2. The cage of claim 1, further comprising:
   a first coupling member comprising the internal electrical contact; and
   a second coupling member comprising the external electrical contact, the first and second coupling members being mechanically interlocked to each other and providing electrical continuity between the internal and external electrical contacts.

3. The cage of claim 1, wherein the wall that is traversed by the at least one electrical feedthrough has an aperture, the compressible post extending through the aperture.

4. The cage of claim 1, wherein the at least one electrical feedthrough comprises an electrical terminal that is adapted to conductively fasten to an electrical lead from an electronic device inside the living space, the electrical terminal comprising the internal electrical contact.

5. The cage of claim 2, wherein at least one of the first coupling member or second coupling member consists essentially of plated copper or copper alloy.

6. The cage of claim 2, wherein at least one of the first coupling member or second coupling member consists essentially of galvanized steel, plated steel, or steel alloy.

7. The cage of claim 2, wherein at least one of the internal or external electrical contacts has a substantially dome shaped contact surface.

8. The cage of claim 2, wherein at least one of the internal or external electrical contacts has a substantially flat contact surface.

9. The cage of claim 3, wherein the compressible post has a diameter that is greater than a diameter of the aperture.

10. The cage of claim 3, wherein the compressible post comprises at least one barb.

11. The cage of claim 10, wherein the first coupling member comprises a substantially hollow structure.

12. The cage of claim 11, wherein the at least one barb is disposed within the substantially hollow structure.

13. The cage of claim 2, wherein the at least one electrical feedthrough comprises at least one elastomeric seal that is disposed between the first coupling member and the second coupling member.

14. The cage of claim 1, wherein the at least one electrical feedthrough consists essentially of plated copper or copper alloy.

15. The cage of claim 1, wherein the at least one electrical feedthrough consists essentially of galvanized steel, plated steel, or steel alloy.

16. The cage of claim 1, wherein at least one of the internal or external electrical contacts has a substantially dome-shaped contact surface.

17. The cage of claim 1, wherein at least one of the internal or external electrical contacts has a substantially flat contact surface.

18. The cage of claim 1, wherein a thickness of the at least one wall traversed by the at least one electrical feedthrough is less than 5 mm.

19. The cage of claim 18, wherein the thickness is less than 3 mm.

20. The cage of claim 19, wherein the thickness is less than 1 mm.

21. The cage of claim 1, wherein a volume of the cage is less than 60 liters.

22. The cage of claim 21, wherein the volume is less than 20 liters.

23. The cage of claim 22, wherein the volume is less than 10 liters.

24. A system for monitoring at least one experimental animal, the system comprising:
a cage and an electronic monitor configured to receive the cage, wherein the cage comprises:
one or more walls that enclose a living space for at least one experimental animal, at least one of the one or more walls comprising a plastic material; and
at least one electrical feedthrough that traverses one of the at least one wall, the at least one electrical feedthrough comprising:
an internal electrical contact located inside the living space;
an external electrical contact located outside the living space; and
a compressible post interlocking the internal and external electrical contacts with each other, the compressible post configured to inelastically expand in diameter when compressed, the internal and external electrical contacts being electrically connected through the compressible post; and
wherein the electronic monitor comprises at least one monitor electrical contact configured to electrically connect to the at least one electrical feedthrough when the cage is received by the electronic monitor.

25. The system of claim 24, wherein the electronic monitor further comprises an arm, the arm positioning the at least one monitor electrical contact such that it abuts the at least one electrical feedthrough when the cage is received by the electronic monitor.

26. An electrical feedthrough for providing electrical continuity through a wall of a cage for housing an experimental animal, the wall being one of one or more walls that enclose a living space for the experimental animal, the electrical feedthrough comprising:
a first coupling member comprising an internal electrical contact, the first coupling member adapted to dispose the internal electrical contact inside the living space; and
a second coupling member comprising an external electrical contact, the second coupling member adapted to dispose the external electrical contact outside the living space,
the first coupling member or second coupling member comprising a compressible post that is adapted to mechanically interlock the first and second coupling members with each other and provide electrical continuity through the wall and between the internal and external electrical contacts, the compressible post configured to inelastically expand in diameter when compressed.

27. The cage of claim 2, wherein either the first coupling member or the second coupling member comprises the compressible post, and wherein the other of the first coupling member or the second coupling member has an opening through which the compressible post extends.

28. The system of claim 24, wherein either the internal electrical contact or the external electrical contact has an opening through which the compressible post extends.

29. The electrical feedthrough of claim 26, wherein the coupling member that does not comprise the compressible post has an opening through which the compressible post extends.

* * * * *